United States Patent
Jessberger

(10) Patent No.: US 6,713,910 B2
(45) Date of Patent: Mar. 30, 2004

(54) CONTROL UNIT COMPRISING AN ELECTRIC MOTOR WITH A ROTARY MAGNET

(75) Inventor: Thomas Jessberger, Rutesheim (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/904,569

(22) Filed: Jul. 16, 2001

(65) Prior Publication Data

US 2002/0047406 A1 Apr. 25, 2002

(30) Foreign Application Priority Data

Jul. 15, 2000 (DE) .......................... 100 34 489

(51) Int. Cl.⁷ .............................................. H02K 28/00
(52) U.S. Cl. ....................................... 310/77; 310/75 R
(58) Field of Search ........................... 310/76–78, 75 C, 310/75 R, 93–94, 100; 418/61.2, 159; 180/68.1, 69.22, 65.5–65.7; 123/41.04–41.07, 41.11, 41.49, 198 E

(56) References Cited

U.S. PATENT DOCUMENTS 4,059,779 A * 11/1977 Wistinghausen ............. 310/77
5,600,191 A * 2/1997 Yang .......................... 180/65.5
5,796,192 A * 8/1998 Riepl ......................... 180/65.5
5,920,136 A * 7/1999 Schmid ........................ 310/77

FOREIGN PATENT DOCUMENTS

DE 4026918 2/1992

* cited by examiner

Primary Examiner—Tran Nguyen
(74) Attorney, Agent, or Firm—Crowell & Moring LLP

(57) ABSTRACT

A control unit comprising at least one electric motor with rotary magnets and optionally a control element, in which arresting elements ensuring the end positions of the control element are provided between movable and stationary parts of the control unit. The drive shaft 11 of the motor 10 is provided, for instance, with radial depressions 18, which engage with a snap connection 19, 20 on the stator. Switching the position of the drive shaft 11 between the two radial depressions defines the control range of the control element. The arresting elements have the advantage that no switching current needs to be applied to the rotary magnet motor except for switching the control element between the two locking positions. This reduces the current consumption of the control unit, while at the same time, enabling high switching speeds to be achieved by the rotary magnet motor.

9 Claims, 2 Drawing Sheets

CONTROL UNIT COMPRISING AN ELECTRIC MOTOR WITH A ROTARY MAGNET

BACKGROUND OF THE INVENTION

The invention relates to a control unit comprising at least one electric motor with a rotary magnet constructed as a rotor. The invention also relates to a control unit for a motor vehicle which includes a control element, especially a flap valve.

Electric motors with rotary magnets are known, for example, from DE 40 26 918. The object of using such an electric motor is to make it possible to create a direct drive of a control element within a limited angular range without the aid of commutators. The electric motor drive according to this document is suitable, in particular, for adjusting a member, which controls the fuel-air mixture of an internal combustion engine.

In automotive engineering, rotary magnets are used to control flaps because they provide a substantially shorter switching times in the range of about 25 milliseconds. With conventional dc motors, the obtainable switching times are about 100 milliseconds. Compared to conventional electric motors, however, the current consumption of motors equipped with a rotary magnet is 6- to 7-fold. As a result, currents of 5 amperes are required. Since an electric motor with rotary magnet has no self-locking element, the control element to be actuated must be held by a spring against a limit stop and is brought into the other position by switching on the motor. To keep it in this other position, the motor must remain on, so that a continuous driving power of 60 watts is required. This has the drawback of increasing the fuel consumption of the vehicle.

SUMMARY OF THE INVENTION

It is an object of the invention to provide a drive for a control member with low average energy consumption over the operating time of the control element.

A further object of the invention is to provide a drive for a control member which can assure short switching times.

These and other objects are achieved in accordance with the present invention by providing a control unit comprising an electric motor with a rotary magnet constructed as a rotor, having a drive shaft and an externally excited stator, wherein the motor is provided with at least one releasable arresting element interposed between movable and stationary parts of the motor, and the arresting element when engaged holds the drive shaft in a set position.

In accordance with a further aspect of the invention, the objects are achieved by providing a control module comprising a control element and an actuator, the actuator comprising an electric motor with a rotary magnet constructed as a rotor and having a drive shaft connected to the control element and an externally excited stator, wherein the control module further comprises at least one releasable arresting element interposed between movable and stationary parts of the module, and the arresting element when engaged holds the drive shaft in a set position.

The control unit according to the invention has an electric motor known per se with rotary magnets as a rotor and with a separately excited stator. The control unit is characterized in that the motor has at least one arresting element between movable and stationary parts for keeping the drive shaft in a certain position. This position is determined by the application and is determined, for instance, by the design constraints of the control member that is to be driven. The release force for the arresting element must be smaller than the actuating force applied by the motor, so that the control element can be moved from the engaged position into another position by actuating the motor. If, however, the control element is in the desired position and secured, it is not necessary to apply a current to the motor, since the control element is fixed in this position. Only for the switching process itself is a current required to adjust the control element.

It is advantageous to provide two arresting elements for the control element, one in each end position. Actuating the motor then switches the control element from one secured position to the other. A corresponding control of the motor with different currents makes it possible to provide additional locks for intermediate positions of the control element. They fix the control element when a low rapid current is applied and can be overcome when the full rapid current is applied. The above-described known control unit in which a counter force is produced by a spring can also be improved by an arresting element. The release force for this lock must be greater than the spring force acting on the control element in the corresponding end position. With the support of the motor, the control element can be released from its secured end position.

In accordance with an alternative embodiment of the invention, both the control element and the electric motor are integrated into the control unit. The arresting element can accordingly be fixed either to the control element or to the motor. It is only necessary that the arresting element is provided with effective cooperating elements between movable and stationary parts of the control element. For instance, the control element can be configured as a flap valve, and its end positions can snap into the arresting elements, which are fixed directly to the motor housing. This provides greater design freedom for the corresponding application. Furthermore, conventional rotary magnet motors may be used, and locking can be assured by movable and stationary parts of the control element.

According to one specific embodiment of the invention, at least one arresting element has a limit stop for the control element. This precisely defines the end position of the control element. Advantageously, the limit stop can furthermore have a sealing surface if the control element is configured as a sealing member. The sealing surface interacts directly with the sealing member to improve its functional reliability.

In accordance with another embodiment of the invention, locking can be ensured by elastic elements, which produce a form-fit connection. To release and close the lock, the elastic element is deformed. Another possibility is to create the lock by mating or corresponding contact surfaces, which produce a frictional connection. This can also provide a seal between the control element and the arresting element, which has the same effect as the above-described sealing surface.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
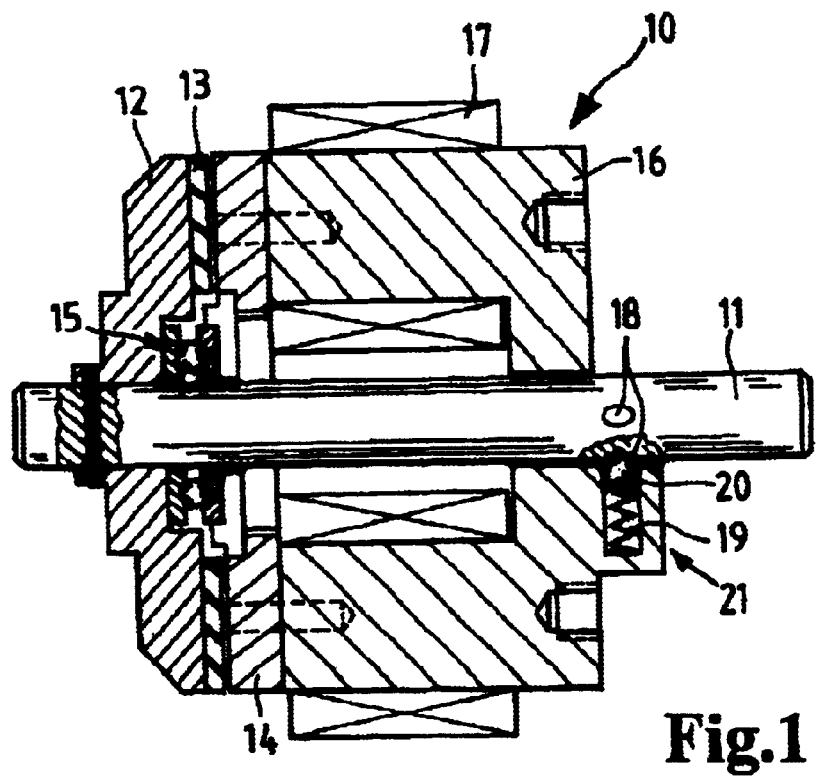
FIG. 1 is a section through a motor with rotary magnets and an arresting mechanism.

FIG. 1 shows an electric motor 10 having a drive shaft 11 to which a supporting disk 12 with a rotary magnet 13 is mounted. Drive shaft 11 is supported on an intermediate plate 14 in a ball bearing 15. The intermediate plate 14 is connected to a stator 16 provided with external excitation 17 formed by coil elements.

By activating external excitation 17, the drive shaft can be rotated by a defined angle, which angle is limited by radial bores or depressions 18 formed in the shaft. A snap ball 20 is mounted via a spring 19 to stator 16, which snaps into radial depressions 18 in defined end positions of drive shaft 11. Thus, snap ball 20, spring 19 and radial depressions 18 form an arresting element 21.

Figure 2:
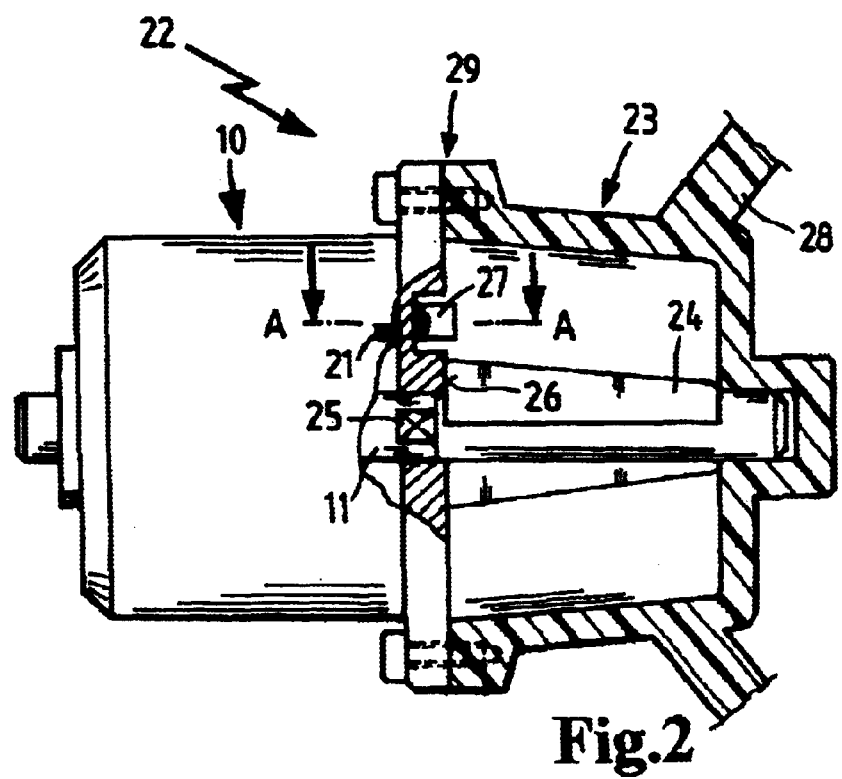
FIG. 2 shows the arrangement of a flap valve on a motor according to FIG. 1, in which an arresting element for the flap vane is mounted to the motor housing.

FIG. 2 depicts a control unit 22 comprising a motor 10 and a control element 23. The control element 23 is a flap valve with a flap 24, which is coupled to drive shaft 11 of the electric motor via a square connection 25. The arresting element 21 is formed by an edge 26 of the flap and a bracket 27, which is made of spring steel. To lock edge 26 in the arresting element, the elastic bracket springs back to fix the edge in its end position. The control element forms part of an outlined suction pipe 28 intended for an internal combustion engine. The motor and the control element are interconnected via a flanged joint 29.

Figure 3:
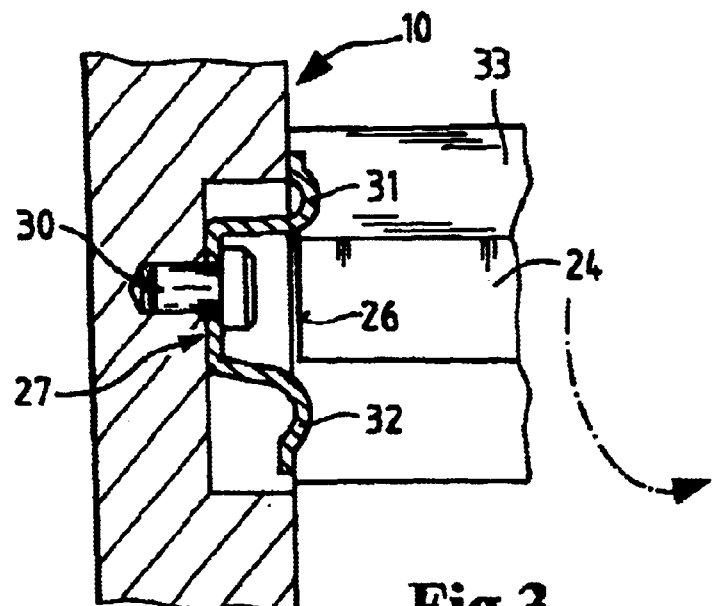
FIG. 3 shows a section along line A—A through the arresting element, which is configured as a metal bracket.

FIG. 3 shows bracket 27 according to FIG. 2. Bracket 27 is mounted to motor 10 by means of a riveted connection 30. One side of the bracket forms a limit stop 31. The other side of the bracket is formed by an elastic tongue 32, which yields resiliently when edge 26 of flap 24 passes the bracket. In addition to the flap, a flap shaft 33 is shown. The opening direction of the flap 24 away from limit stop 31 is indicated by an arrow.

Figure 4:
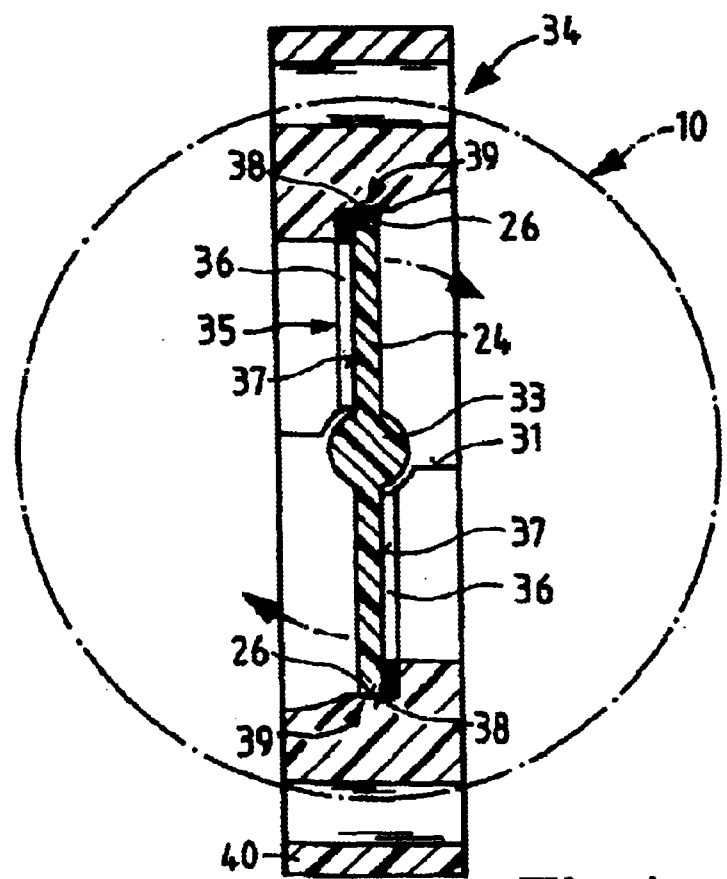
FIG. 4 depicts an assembly injection molded flap module with an arresting element, in which the motor is outlined.

FIG. 4 shows an embodiment of an injection molded flap module 34. The module is mounted to electric motor 10, which is indicated by an outline. Inside the flap module, a seal 35 made of two half rings 36 is arranged. Seal 35 has a sealing surface 37 in the direction of edge 26 of the flap. The flap edge further engages with a contact surface 38, which together with edge 26 forms an arresting element 39. This arresting element is produced by an undersized dimension of the flap opening in relation to the diameter of flap 24. In other words, this is a frictional connection, which must be overcome by the switching torque of motor 10. For the open position of flap 24, which is reached by rotation in the direction of the arrow, limit stops 31 are provided in a flap frame 40. Locking in this position could be effected by the brackets illustrated in FIG. 3.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A control unit comprising an electric motor with a rotary magnet constructed as a rotor, having a drive shaft and an externally excited stator, and electrical coils for externally exciting said stator, wherein said motor is provided with at least one releasable arresting element interposed between movable and stationary parts of the motor, said arresting element when engaged holding the drive shaft in a set position, wherein said control unit is operatively connected to a motor vehicle control element so as to actuate said control element, wherein said control element is a flap valve in an air intake duct of an internal combustion engine.

2. A control unit comprising an electric motor with a rotary magnet constructed as a rotor, having a drive shaft and an externally excited stator, and electrical coils for externally exciting said stator, wherein said motor is provided with at least one releasable arresting element interposed between movable and stationary parts of the motor, said arresting element when engaged holding the drive shaft in a set position, the control unit further comprising a second arresting element, each of said arresting elements defining an end position of said drive shaft.

3. A control unit according to claim 1, wherein said arresting element is provided with an elastically resilient element for producing a interlocking connection with said drive shaft.

4. A control unit according to claim 1, wherein said arresting element is provided with contact surfaces which produce a frictional connection to the drive shaft.

5. A control module comprising a control element and an actuator, said actuator comprising an electric motor with a rotary magnet constructed as a rotor and having a drive shaft connected to the control element and an externally excited stator, wherein said control module further comprises electrical coils for externally exciting said stator and at least one releasable arresting element interposed between movable and stationary parts of said module, said arresting element when engaged holding the drive shaft in a set position, wherein said control element is a flap valve in an air intake duct of a motor vehicle engine.

6. A control module comprising a control element and an actuator, said actuator comprising an electric motor with a rotary magnet constructed as a rotor and having a drive shaft connected to the control element and an externally excited stator, wherein said control module further comprises electrical coils for externally exciting said stator and at least one releasable arresting element interposed between movable and stationary parts of said module, said arresting element when engaged holding the drive shaft in a set position, the control module further comprising a second arresting element, each of said arresting elements defining an end position of said drive shaft.

7. A control module comprising a control element and an actuator, said actuator comprising an electric motor with a rotary magnet constructed as a rotor and having a drive shaft connected to the control element and an externally excited stator, wherein said control module further comprises electrical coils for externally exciting said stator and at least one releasable arresting element interposed between movable and stationary parts of said module, said arresting element when engaged holding the drive shaft in a set position, wherein at least one arresting element comprises a limit stop for the control element, wherein said control element comprises a sealing member, and said limit stop comprises a sealing surface against which said sealing member is held in a closed state.

8. A control module comprising a control element and an actuator, said actuator comprising an electric motor with a rotary magnet constructed as a rotor and having a drive shaft connected to the control element and an externally excited stator, wherein said control module further comprises electrical coils for externally exciting said stator and at least one releasable arresting element interposed between movable and stationary parts of said module, said arresting element when engaged holding the drive shaft in a set position, wherein said arresting element is provided with an elastically resilient element for producing a form-fit connection with said drive shaft.

9. A control module according to claim 5, wherein said arresting element is provided with contact surfaces which produce a frictional connection to the actuator or the control element.

* * * * *